United States Patent [19]

Tatami

[11] Patent Number: 4,635,097
[45] Date of Patent: Jan. 6, 1987

[54] METHOD AND SYSTEM FOR PROCESSING DIGITAL VIDEO SIGNAL INCORPORATING PHASE-CORRECTION FEATURE

[75] Inventor: Mitsushige Tatami, Kanagawa, Japan

[73] Assignee: Sony Corporation, Tokyo, Japan

[21] Appl. No.: 700,733

[22] Filed: Feb. 11, 1985

[30] Foreign Application Priority Data

Feb. 14, 1984 [JP] Japan ................... 59-25900

[51] Int. Cl.$^4$ ............................................. H04N 7/13
[52] U.S. Cl. ........................................... 358/13; 358/19
[58] Field of Search ............... 358/320, 324, 325, 326, 358/327, 13, 19; 375/118, 119, 120

[56] References Cited

U.S. PATENT DOCUMENTS

| | | | |
|---|---|---|---|
| 4,015,288 | 3/1977 | Ebihara | 358/320 |
| 4,291,332 | 9/1981 | Kato | 358/19 |
| 4,562,456 | 12/1985 | Bolger | 358/13 |

*Primary Examiner*—Michael A. Masinick

*Attorney, Agent, or Firm*—Lewis H. Eslinger; Alvin Sinderbrand

[57] ABSTRACT

A method and system for converting an analog video input signal into a digital video signal corrects for jitter and other spurious input frequency errors without the need for a time base correction circuit. The phase of the video input signal relative to a reference pulse signal is measured at two points of time during video signal processing and the two measured phase values are compared to derive a phase error signal indicative of the spurious phase error for a corresponding horizontal scan line. The phase error signal is then used to adjust the phase of sampling clock pulses used to sample analog video input signal values of the corresponding scan line for conversion to digital values. Each clock pulse is phase-shifted only slightly, as the derived spurious phase error is distributed evenly among all of the clock pulses for the corresponding scan line. Preferably, the phase error is distributed linearly across the corresponding scan line and mirror-symmetrically about the center of the scan line.

24 Claims, 5 Drawing Figures

METHOD AND SYSTEM FOR PROCESSING DIGITAL VIDEO SIGNAL INCORPORATING PHASE-CORRECTION FEATURE

BACKGROUND OF THE INVENTION

The present invention relates generally to a method and a system for processing a video signal. More particularly, the invention relates to a method and system for processing an input video signal which is sampled at points of uniform phase so as to be vertically aligned on a screen.

When an analog input video signal is processed for conversion into a digital video signal in preparation for recording, reproduction, broadcast and so forth, it is considered good practice to use synchronization and sample gating signals to ensure that the sampling phases of the analog input video signal are aligned in predetermined relationships. For example, when interlacing screen lines by averaging the digital video signal values for screen pixels immediately above and below each interlaced pixel, it is essential that the sampling phases for every line on the screen be aligned to ensure accurate average values. In addition, when using elements such as a noise reducer, a comb filter or the like, the sampling phases, i.e. the position of sampled data in each line of the screen, must be vertically aligned.

Conventionally, a time base correction circuit (TBC) has been employed to match the sampling phases during conversion of an analog video signal into a digital video signal. Digital data sampling is performed on the output of the time base correction circuit.

In this case, the time base correction circuit converts the analog input video signal into a pulse train indicative of a fixed number of sampled video signal values between successive pulses of a synchronizing signal contained in the input video signal, and stores the sampled video signal values in a memory. Thereafter, a read-out clock signal is produced in phase with the sampling phase of the analog input video signal. The sampled data is read out from the memory synchronously with this clock signal to re-form the analog video signal. This processing by means of the time base correction circuit has been generally accepted as an effective way of removing jitter from the analog input video signal. However, since this process always requires analog-to-digital conversion and digital-to-analog conversion, it inevitably degrades the video signal content. Also, this conventional circuit construction is complicated and bulky due to the presence of the time base correction circuit.

SUMMARY OF THE INVENTION

Therefore, it is an object of the invention to provide a method and system for processing an analog input video signal to convert the same into a digital video signal and which can align sampling phases without a time base correction circuit and therefore exhibits a relatively simple circuit layout.

In order to accomplish the aforementioned and other objects, in a method for processing an input video signal according to the present invention, the phase difference between each line of the analog input video signal and a reference pulse signal is detected and used to derive an error signal, and a delayed signal is produced by delaying the video signal by a predetermined period, namely one horizontal scan period. The phase of each sampling point of each horizontal line is adjusted in such a manner that phase deviation for the entire line corresponding to the current value of the error signal is distributed uniformly over all of the sampling points in the current horizontal line.

By dividing the phase deviation among all of a constant number of sampling points in each horizontal line, the phase of corresponding sampling points can be vertically aligned without a time base correction circuit.

In accordance with one aspect of the invention, a method for processing digital video signal comprises the steps of:
measuring the phase of the analog input video signal at a given timing relative to a reference pulse signal phase and deriving a measured phase difference therebetween;
delaying the input video signal for a given period to obtain a delayed video signal;
measuring possible spurious phase error in the input video signal by measuring the rate of change of the phase difference between the input video signal and the reference pulse signal;
producing a predetermined number of clock pulse in each horizontal line interval, the clock pulses being derived from the reference pulse signal by shifting the phase of every pulse of the reference pulse signal by the measured phase difference so as to be in phase with the video input signal and shifting the phase of each pulse of the phase-shifted reference pulse signal to an extent derived by distributing the measured spurious phase error among the predetermined number of clock pulses for each horizontal line; and
deriving the sampling signals from the clock pulses.

Similarly, in order to accomplish the aforementioned and other objects, a system for processing an input video signal, according to the present invention, includes a detector which detects the phase difference between the analog input video signal and a reference pulse signal and produces an error signal indicative thereof, and a delay circuit which produces a delayed signal by delaying the input video signal for a predetermined period. The system further includes a phase-correction circuit in which the phase of each sampling point on each horizontal line is corrected by distributing the phase difference corresponding to the value of an error signal evenly over all of the sampling points within one horizontal line interval.

According to one aspect of the invention, a system for processing an input video signal comprises a first detector measuring the phase of the analog input video signal at a given timing relative to a reference pulse signal phase and deriving the phase difference therebetween, a delay circuit delaying the input video signal for a given period to obtain a delayed video signal, an error detector measuring possible spurious phase error in the input video signal by measuring the rate of change of the phase difference between the input video signal and the reference pulse signal, a clock pulse generator means for producing a predetermined number of clock pulses in each horizontal line interval, the clock pulses being derived from the reference pulse signal by shifting the phase of every pulse of the reference signal by the measured phase difference so as to be in phase with the video input signal and shifting the phase of each pulse of the phase-shifted reference signal to an extent derived by distributing the measured spurious phase error among the predetermined number of clock pulses for each horizontal line, and a sampling signal generator means for deriving the sampling signals from the clock pulses.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
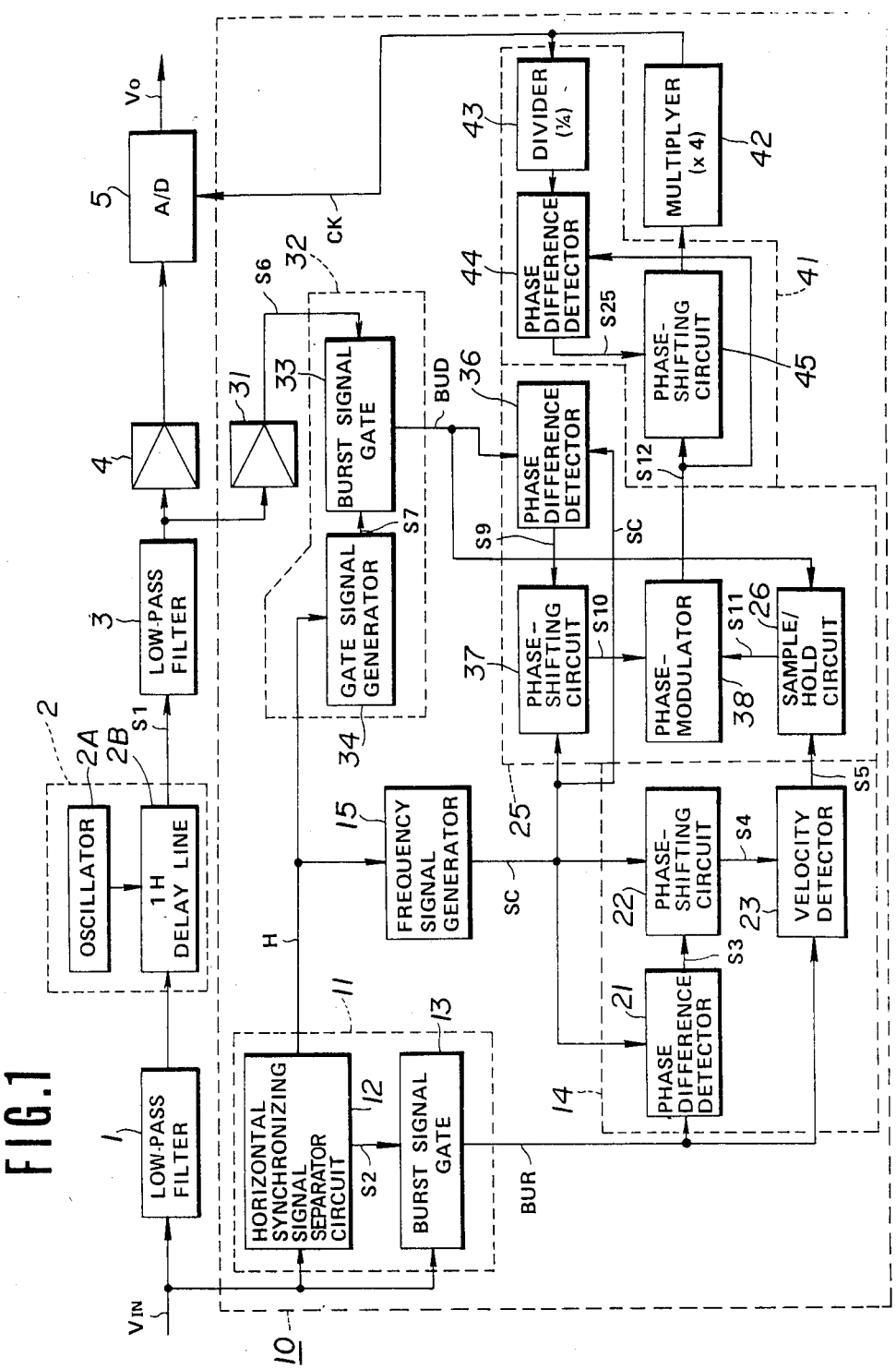
FIG. 1 is a block diagram of the preferred embodiment of an input video signal processing system according to the present invention.

Referring now to the drawings, and particularly to FIG. 1, the preferred embodiment of a video signal processing system in accordance with the present invention is there shown to include a low-pass filter 1 through which an analog input video signal $V_{IN}$ is input to a delay circuit 2 which may comprise a delay line 2B imposing a time delay slightly longer than one horizontal line interval, and which will be referred to hereinafter as "1H delay". Output $S_1$ of the 1H delay 2, now retarded by slightly more than one horizontal line scan interval, is conducted to an analog-to-digital (A/D) converter 5 via a low-pass filter 3 and an amplifier 4. The output of the 1H delay 2 will be referred to hereafter as "1H delay output". The A/D converter 5 converts the received analog signal to a digital video signal $V_0$.

The 1H delay 2 includes an oscillator 2A, which produces an output having a frequency four times that of a color subcarrier frequency $f_{sc}$, and the delay line 2B, which may be a charge-coupled device (CCD), for example, and is triggered by the output of the oscillator 2A.

The A/D converter 5 receives a sampling clock signal CK from a sampling clock generator or generating means 10. The A/D converter 5 samples the 1H delay output $S_1$ in response to each sampling clock signal pulse CK. Therefore, the 1H delay output $S_1$ is sampled at a timing corresponding to the pulse period of the sampling clock signal. The analog-to-digital converter 5 converts the sampled analog signal level into a digital value and outputs a digital video signal $V_0$ in the form of a digital pulse train.

The sampling clock generator 10 comprises a synchronizing signal extracting circuit 11 which includes a horizontal synchronizing signal separator circuit 12 and a burst signal gate 13. The horizontal synchronizing signal separator circuit 12 receives the analog input video signal $V_{IN}$ and separates a horizontal synchronizing signal H from the input video signal. On the basis of the separated horizotnal synchronizing signal H, the horizontal synchronizing signal separator circuit 12 derives a gate signal $S_2$ having a gate period corresponding to the period of the burst signal of the input video signal $V_{IN}$. The gate signal $S_2$ is supplied to the burst gate 13. The burst gate 13 responds to the gate signal $S_2$ by extracting a burst signal BUR from the input video signal $V_{IN}$ and supplying the extracted burst signal BUR to an input phase detector circuit 14. The waveform of the burst signal BUR is shown in (A) of FIG. 2.

On the other hand, the horizontal synchronizing signal H separated by the horizontal synchronizig signal separator circuit 12 is supplied to a reference pulse signal generator 15 which comprises a phase-locked loop (PLL). The reference pulse signal generator 15 is responsive to the horizontal synchronizing signal H to produce a reference pulse signal Schaving a frequency equal to that of the color subcarrier pulse $f_{sc}$. The reference frequency signal SC is input to the input phase detector 14. The waveform of the reference pulse signal SC is seen in (C) of FIG. 2.

Figure 2:
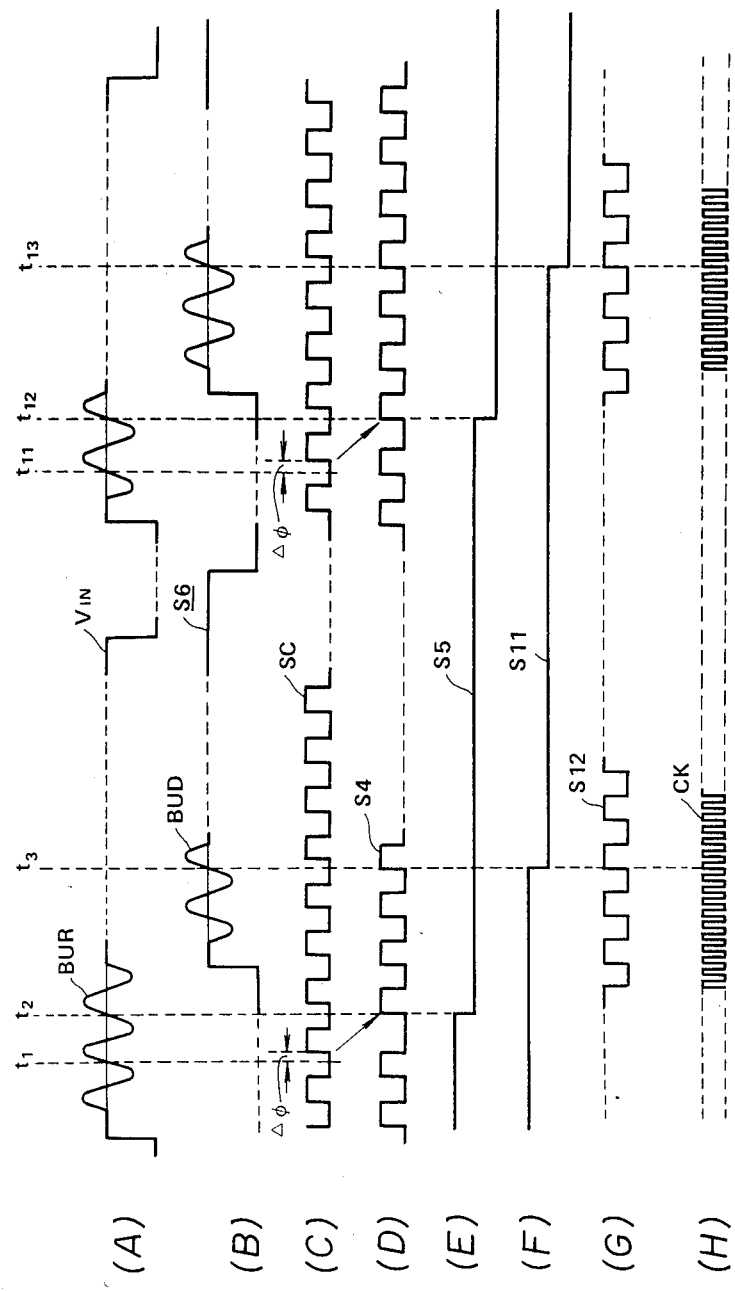
FIG. 2 is a timing chart of signals produced by the components in the system of FIG. 1.

The input phase detector 14 has a phase difference detector 21 triggered by a positive-going zero crossing of the burst signal BUR from the burst gate 13, as shown at time $t_1$ of FIG. 2. When triggered, the phase difference detector 21 measures the phase difference $\Delta\phi$ between the phase of the reference pulse signal SC in (C) of FIG. 2 and the burst signal BUR in (A) of FIG. 2. The phase difference detector 21 then produces a phase difference indicating signal $S_3$ according to the measured phase difference $\Delta\phi$. The phase difference indicating signal $S_3$ is then output to a phase-shifting circuit 22 in the input phase detector 14 at the next positive-going zero point of the burst signal BUR as shown at the time $t_2$ of FIG. 2. The phase-shifting circuit 22 adjusts the phase of the reference pulse signal SC to an extent corresponding to the value of the phase difference indicating signal $S_3$ which represents the phase difference $\Delta\phi$ between the burst signal BUR (FIG. 2A) and the reference pulse signal (FIG. 2C). The phase-shifting circuit 22 outputs a signal $S_4$, with the same pulse as the reference frequency signal but phase-shifted to an extent corresponding to the phase difference indicating signal value ($\Delta\phi$), which signal $S_4$ will be referred to hereafter as "phase-shifted reference pulse signal". As will be apparent from the above and from FIG. 2, the phase-shifted reference pulse signal $S_4$ is thus in phase with the burst signal BUR. The phase-shifted reference pulse signal $S_4$ is applied to a velocity-error detector 23. The velocity-error detector 23 checks the phase difference between the burst signal BUR and the phase-shifed reference signal $S_4$, which should match the phase deviation measured by the phase-shifting circuit 22 when the rotary video head of a VTR providing the analog input video signal $V_{IN}$ is turning at precisely its rated drive speed. The velocity-error detector 23 outputs an error-indicating signal $S_5$ in the form of a direct-current voltage representative of the derived phase difference at time $t_2$.

As set forth above, in order to detect the phase of the analog input video signal $V_{IN}$, the input phase detector 14 produces a phase-shifted reference pulse signal $S_4$ at the pulse of the reference frequency signal from the reference pulse signal generator 15 and in phase with the burst signal BUR, and also produces an error signal $S_5$ indicative of subsequently occurring phase deviation between the burst signal BUR and the phase-shifted reference pulse signal $S_4$. Close inspection of analog input video signals reveals that the phases of the horizontal synchronizing signal H and the burst signal BUR most often differ. Therefore, either the phase of the horizontal synchronizing signal H or the phase of the burst signal BUR must be taken as the phase of the input video signal. The horizontal synchronizing signal H is a rectangular waveform signal and therefore includes a plurality of frequency components. On the other hand, the burst signal BUR is an analog frequency signal. Therefore, it is easier to detect the signal phase of the burst signal BUR than that of the horizontal synchronizing signal H. This allows more accurate detection of the phase of the input video signal. For this reason, in the illustrated embodiment, the phase of the burst signal is preferred for use in determining the phase of the input video signal.

A phase correction circuit 25 includes a sample/hold circuit 26 which is connected to receive the error signal $S_5$ from the velocity-error detector 23. The sample/hold circuit 26 latches the value of the error signal $S_5$ at time $t_3$ determined on the basis of a delayed burst signal BUD extracted from 1H delay output $S_1$. Specifically, the 1H delay output $S_1$ of the 1H delay 2 is applied through an amplifier 31, as delayed input $S_6$ to a delayed burst gate 33 in a delayed signal extracting circuit 32. The waveform of the delayed input $S_6$ is illustrated in (B) of FIG. 2. The time delay imposed by the 1H delay 2 can best be understood by noting that the time points $t_2$ in (A) and $t_{13}$ in (B) correspond to the same screen pixel. Thus the delayed output $S_1$ is retarded by a full scan line period plus the short interval $t_3-t_2$ or $t_{13}-t_{12}$ to allow for signal processing delays. This means that, in FIG. 2, the delayed burst signal BUD is derived from the preceding horizontal line while the error signal $S_5$ is derived from the current burst signal BUR.

The delayed signal extracting circuit 32 also has a gate signal generator 34. The gate signal generator 34, which may, for example, comprise a monostable multivibrator, produces an extracting gate signal $S_7$ as described in detail later. The delayed burst gate 33 responds to the extracting gate signal $S_7$ by extracting the burst signal component BUD from the delayed input $S_6$ from the amplifier 31. The burst signal BUD thus extracted by the delayed burst gate 33 is supplied to the sample/hold circuit 26.

As will be appreciated from FIG. 1, the extracting gate signal generator 34 receives the horizontal synchronizing signal H from the horizontal synchronizing signal separator circuit 12. The extracting gate signal generator 34 is responsive to the leading edge of the horizontal synchronizing signal H to output the extracting gate signal $S_7$ having a period corresponding to the period over which the burst signal BUR appears in the input video signal. Since, the delayed input $S_6$ from the amplifier 31 is delayed by slightly more than one horizontal line interval, the timing of the horizontal synchronizing signal H in the 1H delay output $S_1$ is somewhat offset from that of the input video signal. Therefore, the extracting gate signal generator 34 delays by this known offset the horizontal synchronizing signal H extracted from the input video signal $V_{IN}$ to ensure that all of the delayed burst signal BUD can be extracted from the delayed input $S_6$.

The delayed burst signal BUD from the delayed burst gate 33 is also input to a phase difference detector 36 which is also connected to the reference frequency pulse generator 15 to receive the reference pulse signal SC. The phase difference detector 36 compares the signal phases of the delayed burst signal BUD from the delayed burst gate 32 and the reference pulse signal SC from the reference pulse signal generator 15 to derive the phase difference therebetween. The phase difference detector 36 produces a phase-shifting control signal $S_9$ having a value indicative of the phase difference between the delayed burst signal BUD and the reference pulse signal.

The phase difference detector 36 operates slightly differently than the phase difference detector 21 described above. At the second positive-going zero-crossing point of the delayed burst signal BUD, the phase difference detector 36 compares the phases of the delayed burst signal BUD and the reference pulse signal SC. The phase-shifting control signal $S_9$, which corresponds to the phase difference indicative signal $S_3$ of the phase difference detector 21, is then output immediately to a phase-shifting circuit 37.

The phase shifting circuit 37 receives the phase-shifting control signal $S_9$ from the phase difference detector 36 and shifts the phase of the reference pulse signal SC to an extent corresponding to the value of the phase-shifting control signal $S_9$ from the phase difference detector 36. The phase-shifting circuit 37 outputs a phase-shifted pulse signal $S_{10}$ which is in phase with the delayed burst signal BUR. The phase-shifted frequency signal $S_{10}$ from the phase-shifting circuit 37 is supplied to a phase modulation circuit 38. The phase modulation circuit 38 also receives the output $S_{11}$ of the sample/hold circuit 26.

The phase modulation circuit 38 adjusts the phase of the phase-shifted pulse signal $S_{10}$ from the phase-shifting circuit 37 to an extent determined by the output $S_{11}$ of the sample/hold circuit 26, which is indicative of the phase difference between the burst signal BUR and the phase-shifted reference signal $S_4$. The adjustment of the signal phase of the phase-shifted pulse signal $S_{10}$ is performed gradually and proportionally over a period corresponding to one horizontal line interval. The phase modulation circuit 38 outputs the resulting pulse signal phase-adjusted as described above, for use as a clock signal $S_{12}$. The waveform of the clock signal $S_{12}$ from the phase modulation circuit 38 is shown in (G) of FIG. 2. Although not noticeable in FIG. 2(G), the phase of each successive pulse of the clock signal $S_{12}$ varies slightly, as will become clear later.

Figure 3:
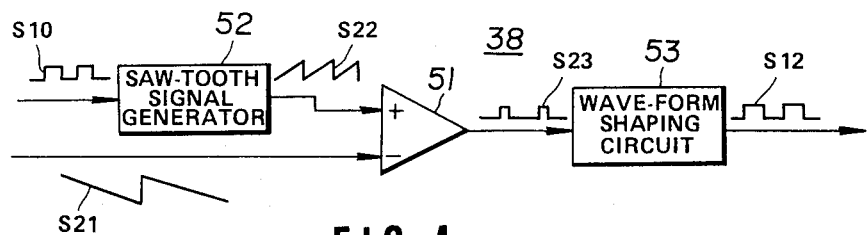
FIG. 3 is a block diagram of a phase modulation circuit included in the preferred embodiment shown in FIG. 1.
Figure 4:
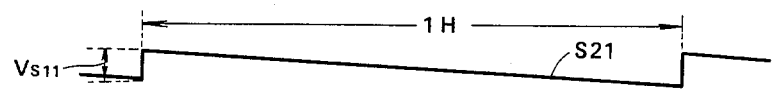
FIG. 4 shows the waveform of the reference signal applied to the comparator in the phase modulation circuit in FIG. 3.

FIG. 3 shows the detailed structure of the phase modulation circuit 38 which includes a level comparator 51. A reference signal $S_{21}$ is applied to an inverting input (−) of the level comparator 51. The reference signal $S_{21}$ is a ramp signal having a waveform as shown in FIG. 4. The reference signal $S_{21}$ starts at a value $V_{S11}$ corresponding to the level of the output $S_{11}$ of the sample/hold circuit 26, at time $t_3$ and then drops linearly to zero over a period equal to one horizontal scan line interval (1H), as shown in FIG. 4.

Figure 5:
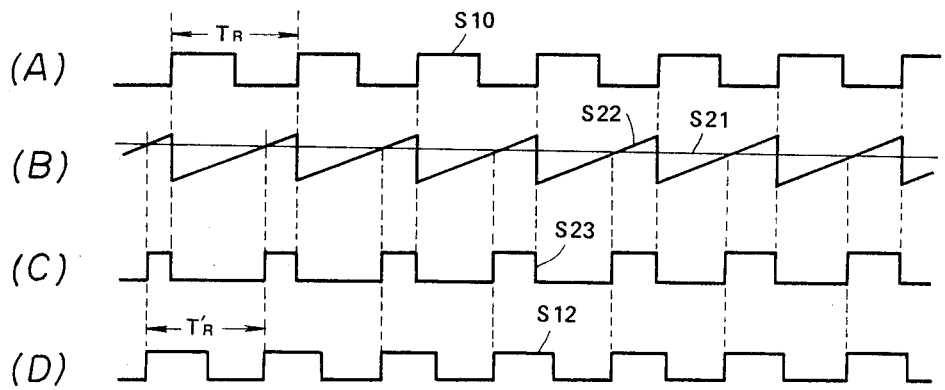
FIG. 5 is a timing chart illustrating one way of modulating the phase of the read-out clock signal.

The phase modulation circuit 38 also has a sawtooth signal generator 52 which receives the phase-shifted reference pulse signal $S_{10}$ from the phase-shifting circuit 37, the waveform of which is illustrated in (A) of FIG. 5. The sawtooth signal generator 52 outputs a sawtooth signal $S_{22}$ with the same period $T_R$ as the phase-shifted reference pulse signal $S_{10}$. The waveform of the sawtooth signal $S_{22}$ has been illustrated in (B) of FIG. 5. The sawtooth signal $S_{22}$ is input to the non-inverting input (+) of the level comparator 51. The level comparator 51 provides a comparator output signal $S_{23}$ which remains HIGH for the period during which the signal level of the sawtooth signal $S_{22}$ exceeds the reference signal level $S_{21}$. A typical waveform of the comparator output $S_{23}$ is illustrated in (C) of FIG. 5. The comparator output signal $S_{23}$ is fed to a waveform shaping circuit 53. When triggered by the leading edge of the comparator output signal $S_{23}$, to the waveform shaping circuit 53 produces a pulse with a predetermined pulse width. The output train of these pulses forms the clock signal $S_{12}$ of (D) of FIG. 5.

It should be appreciated that the period $T_R'$ of the clock signal $S_{12}$ may differ slightly from that of the reference pulse signal SC of the reference pulse signal generator 15, the difference being dependent on the value of signal $S_{11}$ and on the position of each pulse in the horizontal scan line. In the illustrated embodiment, the pulses falling at the center of each horizontal line will always be in precise alignment vertically, and due to the linear nature of the sawtooth signal $S_{22}$ and the reference signal $S_{21}$, the phase error will be divided symmetrically to either side of the screen. This maximizes image quality by limiting the maximum vertical offset and by providing the best accuracy in the center of the image.

In the circuit arrangement of FIG. 3, the phase at which the sawtooth signal level first exceeds the reference level defined by the reference signal $S_{21}$ advances as the reference level of the reference signal $S_{21}$ drops. Therefore, the period $T_R'$ of the clock signal $S_{12}$ varies gradually and continuously at a rate depending upon the rate of decrease of the reference signal determined by the value of the signal $S_{11}$.

As will be appreciated herefrom, since the phase modulation technique set forth above covers an entire cycle of the ramp signal $S_{21}$, that is, one horizontal line interval, over which the value $V_{S11}$ represented by the output $S_{11}$ of the sample/hold circuit 26 is uniformly distributed, the phase error for each horizontal scan line is divided equally among all of the pulses of the clock signal $S_{12}$ for that scan line. Thus, no matter how great the phase error, each scan line will have the same number of pixels or color clock pulses $S_{12}$, and the horizontal offset between pixels of adjoining scan lines will be reduced to a negligible level.

Returning to FIG. 1, the clock signal $S_{12}$ thus produced by the phase modulation circuit 38 is supplied to a multiplier 42 through a temperature compensation circuit 41. In the illustrated embodiment, the multiplier 42 multiplies the clock frequency by 4 to generate a frequency $4f_{sc}$ four-times higher than the pulse of the reference frequency signal. The output of the multiplier 42 serves as the sampling clock CK for the A/D converter 5. The waveform of the sampling clock CK is shown in (H) of FIG. 2.

The temperature compensation circuit 41 compensates for phase variation of the sampling clock CK due to temperature variation and includes a divider 43 which divides the frequency of the sampling clock CK by four to match the frequency of the clock signal $S_{12}$ of from the phase modulation circuit 38. The divided output of divider 43 is fed to a phase difference detector 44 which also receives the clock signal $S_{12}$ from the phase modulation circuit 38. The phase difference detector 44 compares the phases of the clock signal $S_{12}$ and the divided output from the divider 43 and outputs a phase difference indicating signal $S_{25}$ to a phase-shifting circuit 45 interposed between the phase modulation circuit 38 and the multiplier 42. The phase difference indicating signal $S_{25}$ has a value representative of the phase difference between the divided output from the divider 43 and the clock signal $S_{12}$. Therefore, by shifting the phase of the clock signal $S_{12}$ to an extent equal to the phase difference between the divided output and the clock signal $S_{12}$, the phase of the clock signal $S_{12}$ is compensated for possible temperature-dependent variations thereof.

The operation of the preferred embodiment of input video processing system according to the present invention will now be described with reference mainly to FIGS. 1 and 2. At the time $t_1$ in FIG. 2, the phase of the analog input video signal $V_{IN}$, that is, the phase of the burst signal BUR extracted by the burst gate 13 in response to the gate signal $S_2$ from the horizontal synchronizing signal separator circuit 12, is compared with the reference pulse signal SC from the reference pulse signal generator 15, which has the same frequency as the color subcarrier frequency $f_{sc}$, by the phase difference detector 21 of the input phase detector 14. The phase difference indicating signal $S_3$ output by the phase difference detector 21 has a value corresponding to the phase difference between the input video signal phase and the reference pulse signal phase. Phase-shifting operation of the phase-shifting circuit 22 in the input phase detector 14 is controlled by the phase difference indicating signal $S_3$. The phase-shifting circuit 22 shifts the signal phase of the reference pulse signal SC to the extent indicated by the phase difference indicating signal $S_3$ and outputs the phase-shifted reference pulse signal $S_4$, as shown in (D) of FIG. 2, which should be in phase with the burst signal BUR in (A) of FIG. 2. The phase-shifted reference pulse signal $S_4$ is applied to the velocity-error detector 23 at the time $t_2$.

The velocity-error detector 23 measures any existing phase difference between the phase-shifted reference pulse signal $S_4$ and the burst signal BUR and produces an error indicating signal $S_5$ having a value indicative of the derived phase difference. The velocity-error detector 23 supplies the error signal $S_5$ to the sample/hold circuit 26.

At the time $t_3$, the phase of the delayed burst signal BUD, which is extracted from the 1H delayed output $S_1$, is compared with the reference pulse signal SC to derive the phase difference therebetween. The phase of the reference pulse signal is shifted by the phase-shifting circuit 37 to an extent equal to the phase difference between the delayed burst signal BUD and the reference pulse signal SC in order to match the phase of the reference pulse signal with that of the delayed burst signal. The phase-shifted reference pulse signal $S_{10}$ is applied to the phase modulation circuit 38. At the same time, the output $S_{11}$ representing the value held in the sample/hold circuit 26 is also applied to the phase modulation circuit 38.

As set forth above, the phase modulation circuit 38 distributes the phase error indicated by the output $S_{11}$ from the sample/hold circuit 26 among the pulses of the clock signal $S_{12}$ within one horizontal line interval. Therefore, irrespective of the magnitude of the output $S_{11}$ from the sample/hold circuit 26, a predetermined number of pulses of clock $S_{12}$ can be output in each horizontal line interval.

The clock signal $S_{12}$ has its frequency multiplied four times by the multiplier 42 to provide sampling clock CK. The sampling clock CK is output to the A/D converter. Since the clock signal $S_{12}$ from the phase modulation circuit 38 always has a constant, predetermined number of pulses within each horizontal line interval, the sampling clock CK will also always have a constant, predetermined number of pulses. The A/D converter 5 is triggered by each pulse of the sampling clock CK to sample the 1H delay output $S_1$ and output the sampled value as digital video signal $V_0$.

As will be appreciated herefrom, the 1H delay output $S_1$ will be sampled at a predetermined constant number of sample points during each horizontal scan line.

According to the illustrated embodiment, conversion of the analog input video signal $V_{IN}$ into digital video signal $V_0$ is performed at a constant number of sample points within each horizontal line interval, even when the analog input video signal is subject to significant jitter. In addition, the phase offset between corresponding sampling points of each horizontal line is minimized, so that the vertical positions on a screen of corresponding sample points will remain in close alignment.

While the present invention has been disclosed in terms of the specific embodiment illustrated in the drawings, the invention can be embodied in many ways without departing from the principle of the invention and the illustrated embodiment can be modified as necessary or desired to accomplish the same or similar effects. For example, although the phase modulation circuit 38 in the preferred embodiment distributes the phase error linearly among the pulses of the clock signal for each horizontal line, the distribution rate of the phase error among such pulses need not be linear. It is essential only that the distribution be consistent for each horizontal line. Therefore, as long as the phase error is distributed consistently for each horizontal line and as long as the phases of corresponding sample points can be uniform, any distribution technique may be used to embody the present invention. Also, although the illustrated embodiment has been disclosed with reference to analog input video signal processing, in which the clock signal is generated with reference to the 1H delay output produced by delaying the input video signal for one horizontal line interval, the delay can be of any convenient length other than a 1H delay.

Therefore, the present invention should be understood to include all of the possible variations and modifications of the illustrated embodiment coming within the scope of the appended claims.

What is claimed is:

1. A method for processing a digital video signal including conversion of an analog input video signal into a digital output signal by sampling analog video signal values in response to sampling signals, which method comprises the steps of:
    measuring the phase of the analog input video signal at a given timing relative to a reference pulse signal phase and deriving a measured phase difference therebetween;
    delaying the input video signal for a given period to obtain a delayed video signal;
    measuring possible spurious phase error in the input video signal by measuring the rate of change of the phase difference between the input video signal and said reference pulse signal;
    producing a predetermined number of clock pulses in each horizontal line interval, said clock pulses being derived from said reference pulse signal by shifting the phase of every pulse of said reference pulse signal by said measured phase difference so as to be in phase with said input video signal and shifting the phase of each pulse of said phase-shifted reference pulse signal to an extent derived by distributing the measured spurious phase error among the predetermined number of clock pulses for each horizontal line; and
    deriving said sampling signals from said clock pulses.

2. The method as set forth in claim 1, which further comprises a step of extracting from said input video signal a horizontal synchronizing signal defining the beginning of each horizontal line interval.

3. The method as set forth in claim 2, wherein said reference pulse signal has the same frequency as a color subcarrier wave of the input video signal.

4. The method as set forth in claim 2, wherein said step of measuring the phase of said input video signal includes a step of extracting a burst signal from said analog input video signal, the phase of the extracted burst signal being taken as representative of the phase of said input video signal.

5. The method as set forth in claim 4, wherein said given timing for detecting the phase difference between said burst signal phase and said reference pulse signal phase is determined by the phase of said burst signal.

6. The method as set forth in claim 1, which further comprises the steps of:
    measuring the phase of said delayed video signal, comparing said phase of said delayed video signal with said reference pulse signal at said given timing and deriving the phase difference therebetween; and
    shifting the phase of said reference pulse signal to an extent matching the derived phase difference between said delayed video signal and said reference pulse signal so as to match the phase of said reference pulse signal with that of said delayed video signal and so produce a phase-shifted reference pulse signal.

7. The method as set forth in claim 6, wherein said step of shifting the phase of every pulse of said reference pulse signal by said measured phase difference is performed prior to the step of shifting the phase of every pulse of said reference pulse signal to said extent derived from the distributed measured spurious phase error.

8. The method as set forth in claim 7, wherein said step of shifting the phase of every pulse of said reference pulse signal is performed by a phase modulation process including the steps of generating rising sawtooth signals having a duration corresponding to a pulse period of said reference pulse signal, generating a threshold signal having an initial level corresponding to said spurious phase error and gradually decreasing to zero over the period of one horizontal line interval, comparing the level of each sawtooth signal with the level of said threshold signal and producing one of said clock pulses with a fixed pulse width each time said sawtooth signal level increases beyond the level of said threshold signal.

9. The method as set forth in claim 8, which further comprises a step of extracting from said input video signal a horizontal synchronizing signal defining the beginning of each horizontal line interval.

10. The method as set forth in claim 9, wherein said reference pulse signal has the same frequency as a color subcarrier wave of the video input.

11. The method as set forth in claim 9, wherein said step of measuring the phase of said input video signal includes a step of extracting a burst signal from said analog input video signal, the phase of the extracted burst signal being taken as representative of the phase of said input video signal.

12. The method as set forth in claim 11, wherein said given timing for detecting the phase difference between said burst signal phase and said reference pulse signal phase is determined by the phase of said extracted burst signal.

13. The method as set forth in claim 8, wherein the signal level of said threshold signal is so set relative to the signal level of said sawtooth signal that clock pulses produced at the center of each horizontal line interval are precisely in phase with the input video signal.

14. A system for processing a digital video signal including conversion of an analog input video signal into a digital output signal by sampling of analog video signal values in response to sampling signals, the system comprising:

first detector means measuring the phase of the analog input video signal at a given timing relative to the phase of a reference pulse signal and deriving the phase difference therebetween;

delay means delaying the input video signal for a given period to obtain a delayed video signal;

error detector means measuring possible spurious phase error in the input video signal by measuring the rate of change of the phase difference between the input video signal and said reference pulse signal;

clock pulse generator means for producing a predetermined number of clock pulses in each horizontal line interval, said clock pulses being derived from said reference pulse signal by shifting the phase of every pulse of said reference pulse signal by said measured phase difference so as to be in phase with said video input signal and shifting the phase of each pulse of the phaseshifted reference pulse signal to an extent derived by distributing the measured spurious phase error among the predetermined number of clock pulses for each horizontal line; and sampling signal generator means for deriving said sampling signals from said clock pulses.

15. The system as set forth in claim 14. Which further comprises a horizontal synchronizing signal extracting circuit extracting from said input video signal a horizontal synchronizing signal defining the beginning of each horizontal line interval.

16. The system as set forth in claim 15, which includes a reference signal generator generating said reference pulse signal in the form of a train of pulses at the same frequency as a color subcarrier wave of said input video signal.

17. The system as set forth in claim 15, which further comprises a burst gate receiving a burst gate signal from said horizontal synchronizing signal extracting circuit and extracting a burst signal from said analog input video signal, the phase of the extracted burst signal being taken as representative of the phase of said input video signal.

18. The system as set forth in claim 17, wherein said given timing for detecting the phase difference between said burst signal phase and said reference pulse signal phase is determined by the phase of said extracted burst signal.

19. The system as set forth in claim 14, which further comprises:

second detector means measuring the phase of said delayed video signal, comparing the measured phase of said delayed video signal with said reference pulse signal at said given timing and deriving the phase difference therebetween; and phase-shifting means shifting the phase of said reference pulse signal to an extent matching the derived phase difference between said delayed video signal and said reference pulse signal so as to match the phase of said reference pulse signal with that of said delayed video signal and so produce a phase-shifted reference pulse signal.

20. The system as set forth in claim 19, wherein said clock pulse generating means generates rising sawtooth signals having a duration corresponding to the pulse period of said reference pulse signal, and a threshold signal having an initial level corresponding to said spurious phase error and gradually decreasing to zero over the period of one horizontal line interval, compares the level of each of said sawtooth signals with the level of said threshold signal and produces one of said clock pulses with a fixed pulse width each time said sawtooth signal level increases beyond the level of said threshold signal.

21. The system as set forth in claim 20, which further comprises a horizontal synchronizing signal extracting circuit extracting from said input video signal a horizontal synchronizing signal defining the beginning of each horizontal line interval.

22. The system as set forth in claim 21. Which includes reference signal generator means generating reference pulse signal in the form of a train of pulses at the same frequency as a color subcarrier wave of said input video signal.

23. The system as set forth in claim 21, which further comprises a burst gate receiving a burst gate signal from said horizontal synchronizing signal extracting circuit and extracting a burst signal from said analog input video signal, the phase of the extracted burst signal being taken as representative of the phase of said input video signal.

24. The system as set forth in claim 23, wherein said given timing for detecting the phase difference between said burst signal phase and said reference signal phase is determined by the phase of said extracted burst signal.

* * * * *